(12) United States Patent
Binder et al.

(10) Patent No.: US 7,770,940 B2
(45) Date of Patent: Aug. 10, 2010

(54) COUPLING PART FOR A PLUG CONNECTOR ARRANGEMENT

(75) Inventors: Juergen Binder, Leutenbach (DE); Joerg Schmid, Spiegelberg (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 12/217,508

(22) Filed: Jul. 2, 2008

(65) Prior Publication Data

US 2009/0008927 A1 Jan. 8, 2009

Related U.S. Application Data

(63) Continuation of application No. PCT/EP2006/011084, filed on Nov. 18, 2006.

(30) Foreign Application Priority Data

Jan. 5, 2006 (DE) ........................ 10 2006 002 565

(51) Int. Cl.
*F16L 37/12* (2006.01)
*F16L 37/18* (2006.01)

(52) U.S. Cl. .................... 285/316; 285/86; 285/308

(58) Field of Classification Search ............... 285/86, 285/307, 308, 321, 314, 315, 316
See application file for complete search history.

(56) References Cited

U.S. PATENT DOCUMENTS

| | | | | |
|---|---|---|---|---|
| 2,819,914 A | * | 1/1958 | Eitner | 285/70 |
| 2,823,934 A | * | 2/1958 | Gorrell et al. | 285/277 |
| 2,913,263 A | * | 11/1959 | Zajac | 285/277 |
| 3,188,123 A | * | 6/1965 | Hansen | 285/277 |
| 3,314,696 A | * | 4/1967 | Ferguson et al. | 285/148.14 |
| 3,428,340 A | * | 2/1969 | Pelton | 285/95 |
| 3,450,424 A | * | 6/1969 | Calisher | 285/305 |
| 3,574,359 A | * | 4/1971 | Klein | 285/86 |
| 3,603,619 A | * | 9/1971 | Bengesser et al. | 285/45 |
| 3,698,747 A | | 10/1972 | Wing et al. | |

(Continued)

FOREIGN PATENT DOCUMENTS

DE        86 24 767        12/1987

(Continued)

*Primary Examiner*—James M Hewitt
(74) *Attorney, Agent, or Firm*—Lipsitz & McAllister, LLC

(57) ABSTRACT

A coupling part for a plug connector arrangement is provided. The coupling part having a coupling body comprising a receptacle into which a plug-in part can be plugged into in the direction of a longitudinal axis of the receptacle, in order to produce a fluid-tight connection. The coupling part has two spaced-apart locking elements which, in a locking position, penetrate laterally, opposite one another, into the receptacle in order to engage behind the plug-in part and which can be moved into a release position in order to release the plug-in part. A spring element is integrally formed with and connects the locking elements together. In order to develop the coupling part so that it is easier to handle, the coupling part is provided with an actuating element which is adapted to be moved relative to the coupling body. Movement of the actuating element causes the locking elements to be moved out of the locking position into the release position, in which they are spaced apart from one another to a greater extent than in the locking position.

27 Claims, 16 Drawing Sheets

U.S. PATENT DOCUMENTS

| | | | | |
|---|---|---|---|---|
| 3,709,528 A * | 1/1973 | Cruse | | 285/316 |
| 3,948,548 A * | 4/1976 | Voss | | 285/321 |
| 4,541,657 A * | 9/1985 | Smyth | | 285/305 |
| 4,700,926 A * | 10/1987 | Hansen | | 251/149.8 |
| 4,884,829 A | 12/1989 | Funk et al. | | |
| 5,366,259 A * | 11/1994 | Hohmann et al. | | 285/305 |
| 5,553,895 A * | 9/1996 | Karl et al. | | 285/39 |
| 5,704,658 A * | 1/1998 | Tozaki et al. | | 285/305 |
| 5,707,085 A * | 1/1998 | Kubiak | | 285/86 |
| 5,725,257 A * | 3/1998 | Sakane et al. | | 285/81 |
| 5,860,677 A * | 1/1999 | Martins et al. | | 285/26 |
| 5,882,044 A * | 3/1999 | Sloane | | 285/92 |
| 6,131,881 A | 10/2000 | Preisser | | |
| 6,371,528 B1 * | 4/2002 | Kimura | | 285/305 |
| 6,412,828 B1 * | 7/2002 | Lacroix et al. | | 285/316 |
| 6,676,172 B2 * | 1/2004 | Alksnis | | 285/319 |
| 6,688,654 B2 * | 2/2004 | Romero | | 285/308 |
| 6,983,958 B2 * | 1/2006 | Rautureau | | 285/305 |
| 7,021,669 B1 | 4/2006 | Lindermeir et al. | | |
| 7,083,202 B2 * | 8/2006 | Eberle et al. | | 285/124.4 |
| 7,387,318 B2 * | 6/2008 | Yoshida | | 285/321 |
| 2003/0052484 A1 * | 3/2003 | Rautureau | | 285/305 |
| 2004/0021316 A1 * | 2/2004 | Rogg | | 285/308 |
| 2004/0037627 A1 | 2/2004 | Eberle et al. | | |
| 2007/0029796 A1 * | 2/2007 | Bibby | | 285/308 |
| 2007/0236013 A1 * | 10/2007 | Hartmann | | 285/321 |

FOREIGN PATENT DOCUMENTS

| | | |
|---|---|---|
| DE | 198 37 767 | 2/2000 |
| DE | 198 54 685 | 5/2000 |
| DE | 199 15 291 | 10/2000 |
| DE | 100 43 619 | 3/2002 |
| EP | 1 166 003 * | 1/2002 |
| WO | 2005/045299 | 5/2005 |

* cited by examiner

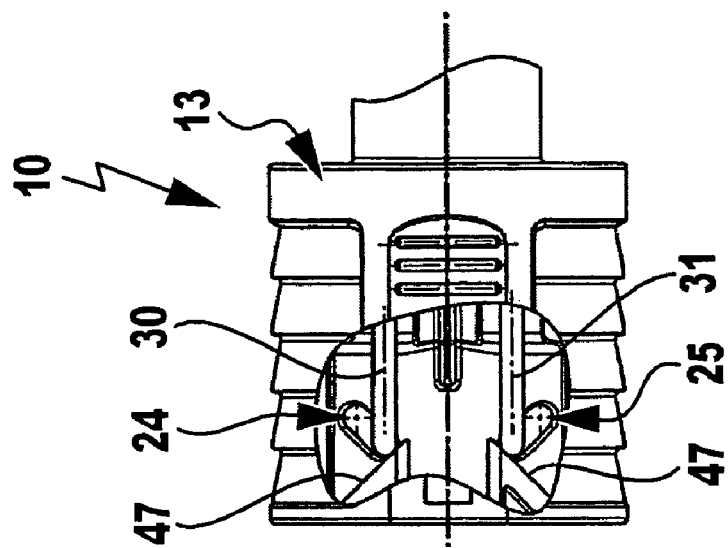
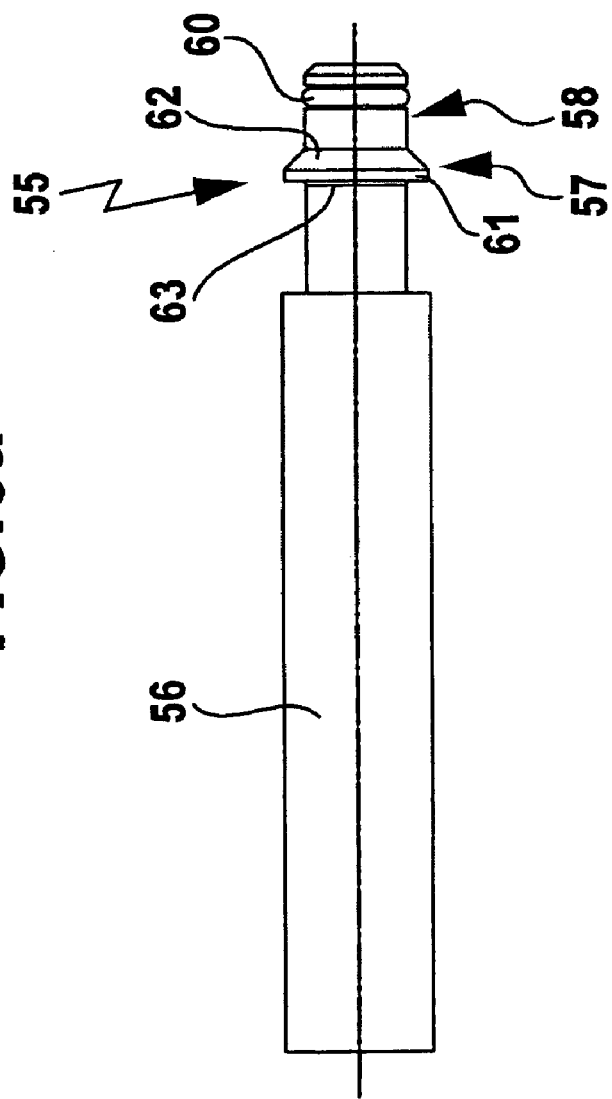
FIG.6a

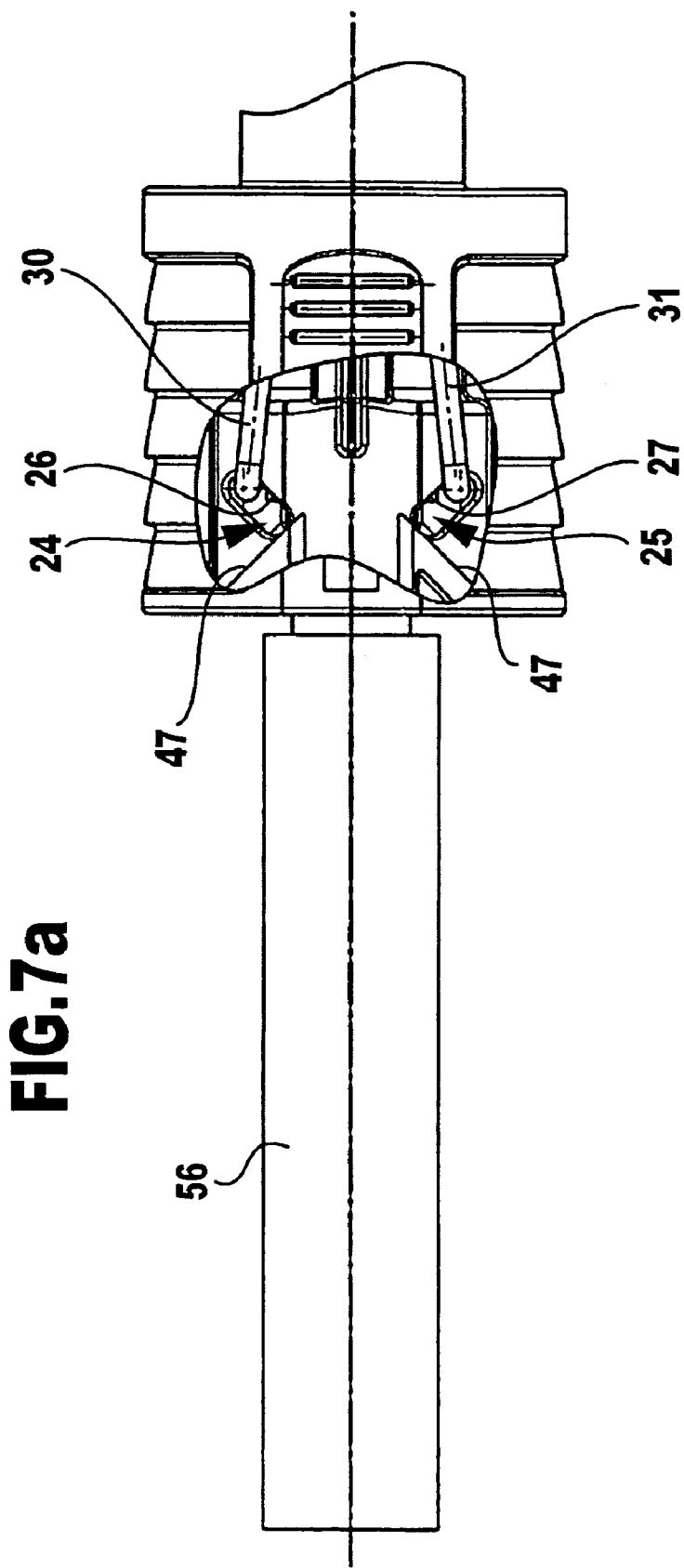

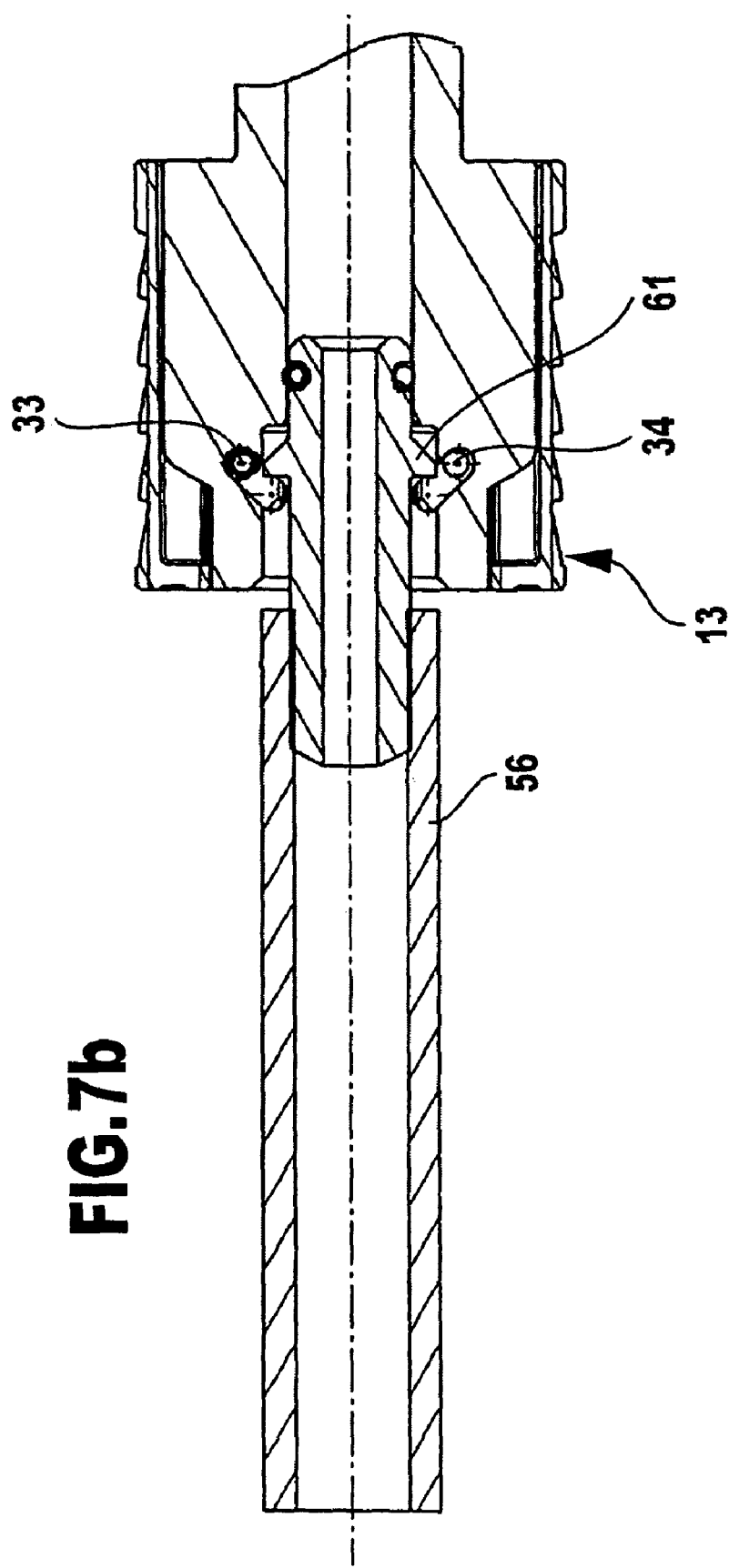

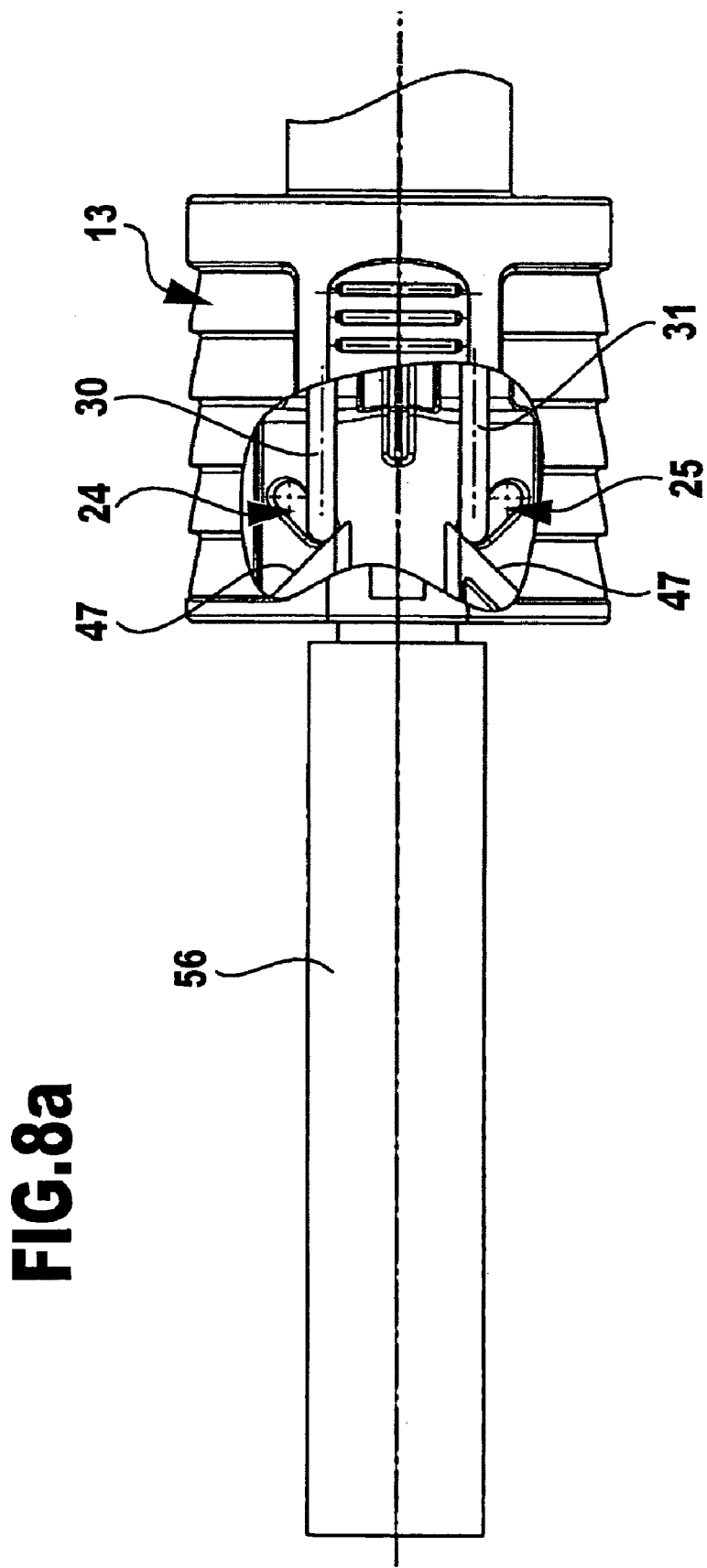

COUPLING PART FOR A PLUG CONNECTOR ARRANGEMENT

This application is a continuation of international application number PCT/EP2006/011084 filed on Nov. 18, 2006.

The present disclosure relates to the subject matter disclosed in international application number PCT/EP2006/011084 of Nov. 18, 2006 and German application number 10 2006 002 565.2 of Jan. 5, 2006, which are incorporated herein by reference in their entirety and for all purposes.

BACKGROUND OF THE INVENTION

The invention relates to a coupling part for a plug connector arrangement.

Releasable plug connector arrangements having a coupling part and a plug-in part, which can be plugged one into the other, are used for connecting pipes and hoses, for example in lines for liquid or compressed air. By virtue of the plug-in part being plugged into the receptacle of the coupling part, it is possible to produce a fluid-tight connection between the plug-in part and the coupling part, and locking elements are used in order to secure the plug-in part in the receptacle. Utility Model DE 86 24 767 U1, in this context, proposes the use of a locking plug having two legs and a cross-piece connecting the two legs. The locking plug can be introduced laterally into the receptacle through slots in the coupling part and, in a locking position, it engages behind undercuts of the plug-in part and thus secures the latter axially in the receptacle. If the plug-in part is to be released then a screwdriver or some other suitable tool is used to grip the locking plug in the region of the cross-piece and pull it laterally out of the receptacle. As a result, the legs of the locking plug spread apart and thus release the plug-in part.

A disadvantage with the known coupling part is that it is difficult to handle, since it requires the use of an additional tool. Moreover, for the purpose of moving the locking elements into their release position, a sufficient amount of space has to be available in the lateral direction in order for the locking elements, in the form of the legs of the locking plug, to be pulled laterally out of the receptacle.

U.S. Pat. Nos. 2,823,934 and 3,709,528 disclose coupling parts for plug connector arrangements, the coupling parts each having an actuating element which can be moved relative to the coupling part. By virtue of the actuating element being moved, locking elements can be moved, counter to a resilient restoring force, into a release position, in which they are spaced apart from one another to a greater extent than in the locking position. These coupling parts have a comparatively complicated construction.

It is an object of the present invention to develop a coupling part of the type mentioned in the introduction so that it has a simple construction and is easy to handle.

SUMMARY OF THE INVENTION

The object is achieved by a coupling part in accordance with the present invention. The coupling part has a coupling body comprising a receptacle into which a plug-in part of the plug connector arrangement can be plugged into in the direction of a longitudinal axis of the receptacle, in order to produce a fluid-tight connection. The coupling part also has two spaced-apart locking elements which, in a locking position, penetrate laterally, opposite one another, into the receptacle in order to engage behind the plug-in part and which can be moved into a release position in order to release the plug-in part. The coupling part also has an actuating element which is adapted to be moved relative to the coupling body. Movement of the actuating element causes the locking elements to be moved counter to a resilient restoring force from a locking position into a release position. A spring element is integrally formed with and connects the locking elements together.

By virtue of the actuating element being moved coaxially, the locking elements can be moved out of their locking position into a release position, in which they are spaced apart from one another to a greater extent than in the locking position. By changing the position of the actuating element relative to the coupling body, it is thus possible to widen the locking elements transversely to the longitudinal direction of the receptacle and thus to release the receptacle to the extent where the plug-in part plugged into the receptacle can be readily pulled out of the receptacle. The coupling part according to the invention is consequently very easy to handle.

The coupling part according to the invention has a simple construction since the only components necessary are a coupling body, with the receptacle into which the plug-in part can be plugged, and also the locking elements and the actuating element. The coupling part according to the invention is thus distinguished by the use of only a small number of components, and is therefore not particularly susceptible to malfunctioning.

The locking elements are adapted to be moved into the release position counter to a resilient restoring force. This has the advantage that they transfer automatically into their locking position provided that the locking elements are not subjected to any actuating force. The locking elements can be transferred out of their locking position into their release position counter to the resilient restoring force. It may be provided that the locking elements are adapted to be arrested in their release position.

In respect of a design of the coupling part which is as simple as possible, it is particularly advantageous if the locking elements are connected to one another via a spring element. The spring element thus forms a connecting element for the two locking elements and can therefore serve as a retaining element for the locking elements. In addition, the locking elements are subjected, via the spring element, to a restoring force in the direction of the locking position of the locking elements.

The coupling part according to the invention can be produced particularly cost-effectively in that the spring element and the locking elements are connected integrally to one another. The spring element and locking elements may be formed, for example, as a single-piece U-shaped wire portion in the form of two legs which are connected to one another via a cross-piece and at the free end of which there is a respective locking element which is angled in relation to the respective leg. The locking element is preferably formed as a locking pin which is oriented perpendicularly to the respective leg.

It is preferably possible for the actuating element to be displaced coaxially in relation to the longitudinal axis of the receptacle, or to be rotated about the longitudinal axis of the receptacle. It may be provided, for example, that the locking elements are adapted to be moved into their release position by virtue of the actuating element being displaced coaxially.

It is advantageous if the locking elements are configured as locking pins which pass laterally through the receptacle. The locking pins can penetrate into the receptacle transversely to the longitudinal axis of the receptacle in order to lock the plug-in part which has been plugged into the receptacle. The locking pins may be configured, for example, as wire pins.

It is advantageous if the locking pins are in each case oriented parallel to one another in the locking position and in the release position. During transfer from their locking position into their release position, the locking pins are thus changed merely in respect of their spacing apart from one another, without being bent or having their mutual orientation changed in any other way.

It has proven particularly advantageous if the spring element is of U-shaped configuration and has two legs which are oriented parallel to the longitudinal axis of the receptacle and are connected to one another via a cross-piece. The spring element can define, with the two legs and the cross-piece, a plane which is oriented parallel to the longitudinal axis of the receptacle. The cross-piece may be curved in the form of an arc of a circle.

In the case of an advantageous embodiment, the cross-piece forms the actuating element, which is adapted to be gripped by the user. This has the advantage that the spring element can be moved directly in order to transfer the locking elements into their release position.

The two locking elements are each connected to a leg of the spring element and, by virtue of the two legs being spread apart, the locking elements can be transferred out of their locking position into their release position.

The spring element is preferably disposed on the outside of the coupling body. This can simplify the assembly of the coupling part according to the invention and, moreover, in the case of such an embodiment, the coupling part is distinguished by a very small size.

The configuration of the actuating element has not been discussed specifically up until now. In the case of an advantageous embodiment, the actuating element encloses the coupling body in the circumferential direction. It is thus possible, in a constructionally straightforward manner, for the actuating element to be retained in captive fashion on the coupling body and, for example by virtue of the annular actuating element being displaced or rotated, the locking elements can be transferred out of their locking position into their release position.

The actuating element may be configured, for example, as a sleeve which encloses the coupling body and the spring element in the circumferential direction. The sleeve thus forms the outside of the coupling part according to the invention, and the spring element is adapted to be positioned between the sleeve and the coupling part.

In order to move the locking elements into their release position, it is provided, in the case of a preferred embodiment, that the coupling body and/or the actuating element have/has sliding surfaces which are oriented obliquely in relation to the longitudinal axis of the receptacle and along which the locking elements slide during transfer from the locking position into the release position. The sliding surfaces form guide members for the locking elements and, as the actuating element is moved, the locking elements slide along the sliding surfaces and are transferred out of their locking position into their release position. The sliding surfaces may be disposed on the coupling body, but as an alternative, or in addition, it may be provided that the actuating element has sliding surfaces. It is particularly advantageous if both the coupling body and the actuating element have associated sliding surfaces, since the locking elements can thus be moved particularly smoothly into their release position.

In the case of an advantageous embodiment, the coupling body has two apertures which are located diametrically opposite one another and have a wall surface which is oriented obliquely in relation to the longitudinal axis of the receptacle and forms a sliding surface, the locking elements each penetrating into an aperture.

The apertures may be configured, for example, as elongate holes which, offset laterally in relation to the center axis of the receptacle of the coupling body, extend through the latter.

As an alternative, it may be provided that the apertures are configured as slots which open out into an outer surface of the coupling body. The slots form a lateral through-passage in the coupling body and extend from the outer surface of the latter to the receptacle, so that the locking elements introduced into the slots penetrate laterally into the receptacle when they assume their locking position.

It is advantageous if the locking elements pass through the apertures, that is to say if each locking element has two end portions which project beyond the respective aperture. The projecting end portions may form engagement surfaces for the actuating element, so that the locking elements can be positioned against the actuating element by way of their end portions and can slide along the sliding surfaces of the apertures by virtue of the actuating element being moved relative to the coupling body.

In the case of a preferred configuration of the coupling part according to the invention, the actuating element encloses the coupling body in the circumferential direction and has at least two stop elements with a stop surface which is oriented obliquely in relation to the longitudinal axis and forms a sliding surface, it being possible for the locking elements to be positioned against the stop surface by way of an end portion which projects beyond the outer surface of the coupling body. In the case of such an embodiment, the actuating element, as the stop surfaces, has guide members for the locking elements, the guide members transferring the locking elements out of their locking position into their release position as the actuating element is moved. The guide members are configured in the form of the stop surfaces of the actuating element, and these are oriented obliquely in relation to the longitudinal axis of the receptacle of the coupling body.

It is advantageous if the actuating element, associated with each locking element, has two stop elements, and the respective locking element is adapted to be positioned against the stop surfaces of these two stop elements by way of first and second end portions which are directed away from one another. In the case of such a configuration, each locking element is gripped by two stop elements when the actuating element is moved, in particular displaced, relative to the coupling body. A first stop element forms a stop surface for a first end portion of the locking element and a second stop element forms a stop surface for the second end portion of the same locking element, the second end portion being directed away from the first end portion. The locking element is thus gripped by a respective stop element at its end regions and can therefore be transferred out of its locking position into its release position without bending.

The actuating element is preferably configured as a sleeve which encloses the coupling body in the circumferential direction and has a radially inwardly directed annular shoulder, on which the stop elements are integrally formed. The annular shoulder forms a narrowing of the sleeve and covers an intermediate space between the sleeve and the coupling body in the axial direction. The stop elements are integrally formed on the annular shoulders in the axial direction, and the locking elements can be positioned against these stop elements when the actuating element is moved.

A high level of ability to withstand mechanical loading can be given to the coupling part according to the invention in that the sleeve is retained on the coupling body such that it cannot be rotated about the longitudinal axis of the receptacle, but can be displaced coaxially in relation to the longitudinal axis. Such a configuration further simplifies the handling of the coupling part since, in order to actuate the coupling part, the user will intuitively displace the non-rotatable sleeve in the longitudinal direction.

In order to secure the sleeve in a non-rotatable manner on the coupling body, it is provided, in the case of an advantageous embodiment, that the sleeve has, on the inside, first guide elements, which interact with second guide elements disposed on the outside of the coupling body.

The first and/or second guide elements may be configured as guide ribs which are oriented parallel to the longitudinal axis of the receptacle. It may be provided, for example, that the sleeve, on the inside, has at least one guide-rib pair, into which penetrates a guide rib projecting from the outside of the coupling body. The coupling body preferably has a plurality of guide ribs which are spaced apart uniformly in the circumferential direction and each penetrate into a guide-rib pair of the sleeve. A converse arrangement may also be provided such that the coupling body has at least one guide-rib pair into which penetrates a guide rib disposed on the inside of the sleeve.

A preferred embodiment ensures a captive connection between the sleeve and the coupling body in that the sleeve is adapted to be latched to the coupling body.

It may be provided that the sleeve is adapted to be latched onto the coupling body in the axial direction.

For example, it may be provided that the sleeve carries, on the inside, two latching protrusions which are located diametrically opposite one another and each interact with a latching element disposed on the outside of the coupling body.

In the case of a particularly preferred embodiment, the receptacle of the coupling body forms a sealing portion and a locking portion, the sealing portion having a cross-section which is rotationally symmetrical in relation to the longitudinal axis of the receptacle and the locking portion having a cross-section which is rotationally asymmetrical in relation to the longitudinal axis of the receptacle, and the locking elements penetrating into the locking portion. By virtue of the rotationally symmetrical configuration of the sealing portion, the plug-in part can be connected in a fluid-tight manner to the coupling body in a constructionally simple manner, namely by means of a sealing ring and, by virtue of the rotationally asymmetrical configuration of the locking portion, into which the locking elements penetrate, it is possible to predefine the orientation of the plug-in part, which can be positioned in the locking portion by way of an undercut region, relative to the coupling body, and the plug-in part can be retained in a rotationally fixed manner by way of the rotationally asymmetrical configuration of the locking portion. Retaining the plug-in part in a rotationally fixed manner once again ensures that the mechanical loading to which the sealing ring, disposed on the plug-in part, is subjected is kept to a very low level.

The locking portion preferably comprises two flat wall portions which are located opposite one another and are connected to one another via two arcuate wall portions. In the case of such a configuration, the locking portion is distinguished by a substantially cylindrical construction comprising two mutually opposite flattened portions which are connected to one another via arcuate wall portions. The locking elements can penetrate into the locking portion in the region of the arcuate wall portions, and the flat wall portions constitute planar bearing surfaces for the plug-in part, which can be plugged into the receptacle.

The invention relates not just to a coupling part of the type mentioned above, but also to a plug connector arrangement having such a coupling part and having a plug-in part which is adapted to be plugged into the receptacle of the coupling body and, on the outside, has at least one undercut, which interacts with a locking element in order to lock the plug-in part in the receptacle.

The undercut preferably extends in the circumferential direction of the plug-in part merely over a sub-region.

It may thus be provided, for example, that the plug-in part has a sealing portion and a locking portion, the sealing portion carrying a circular annular groove, and the locking portion having a protrusion, for example in the form of an outer bead or of a wing or pin, which extends in the circumferential direction merely over a sub-region. The protrusion forms an undercut, behind which a locking element of the corresponding coupling part can engage.

The plug-in part preferably has two protrusions which are located diametrically opposite one another, extend circumferentially in each case over a sub-region and are connected to one another via lateral flattened portions.

In the case of an advantageous embodiment, the at least one protrusion has a conical end surface. This has the advantage that, when the plug-in part is plugged into the receptacle of the coupling body, the conical end surface of the protrusion can be positioned against a locking element and the latter can be pushed radially outward as the plug-in part is introduced further into the receptacle.

A more specific explanation will be given by the following description of preferred embodiments of the invention in conjunction with the drawings.

BRIEF DESCRIPTION OF THE DRAWINGS

FIG. 6a shows a partially cut-away plan view of the coupling part from FIG. 1 prior to the insertion of a plug-in part;

FIG. 7a shows a partially cut-away plan view of the coupling part from FIG. 1 as the plug-in part is being inserted;

FIG. 7b shows a longitudinally sectioned view of the coupling part from FIG. 1 as the plug-in part is being inserted;

FIG. 8a shows a partially cut-away plan view of the coupling part from FIG. 1 with the plug-in part inserted;

DETAILED DESCRIPTION OF THE INVENTION

Figure 1:
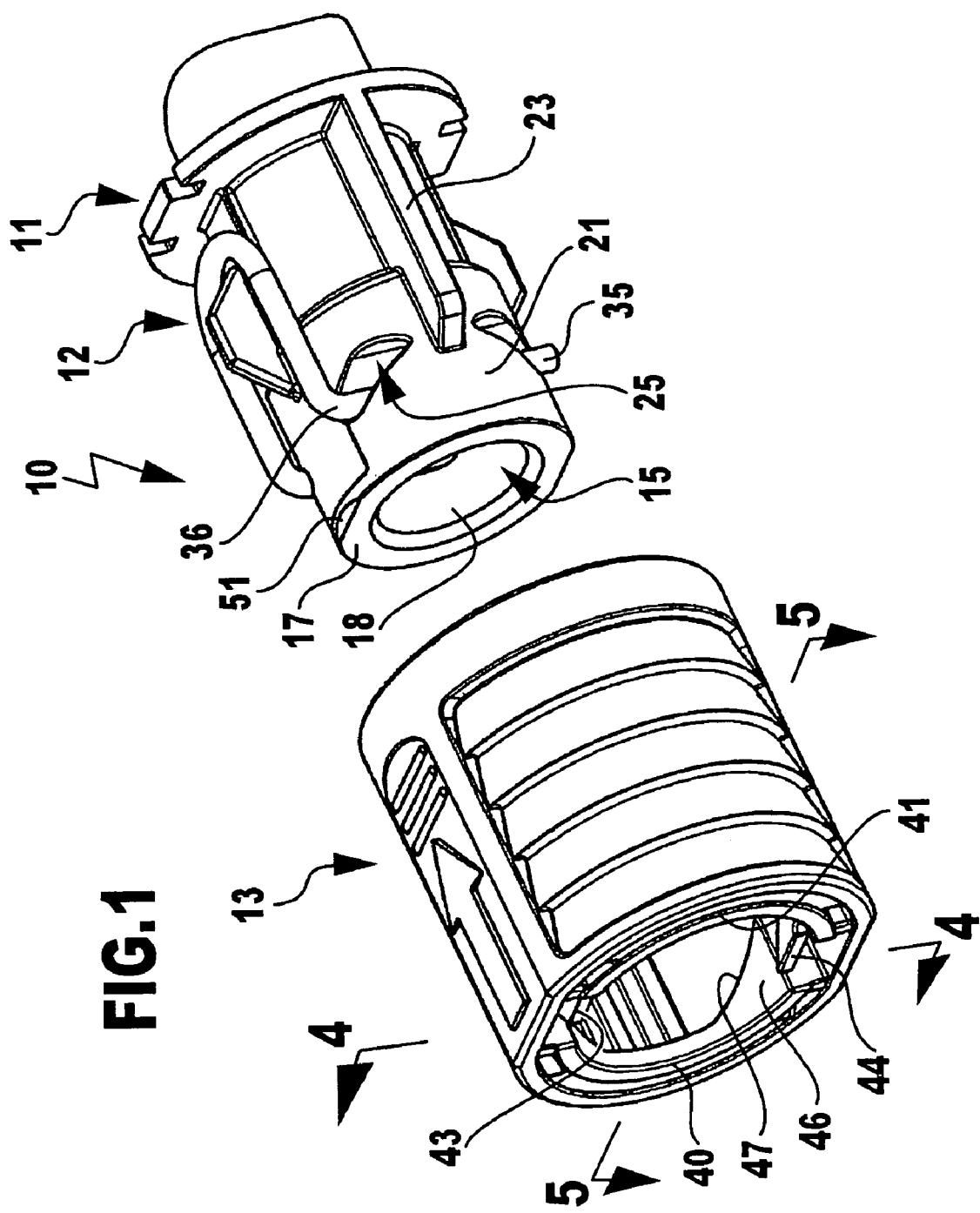
FIG. 1 shows a perspective illustration, in exploded form, of a first embodiment of a coupling part according to the invention.
Figure 2:
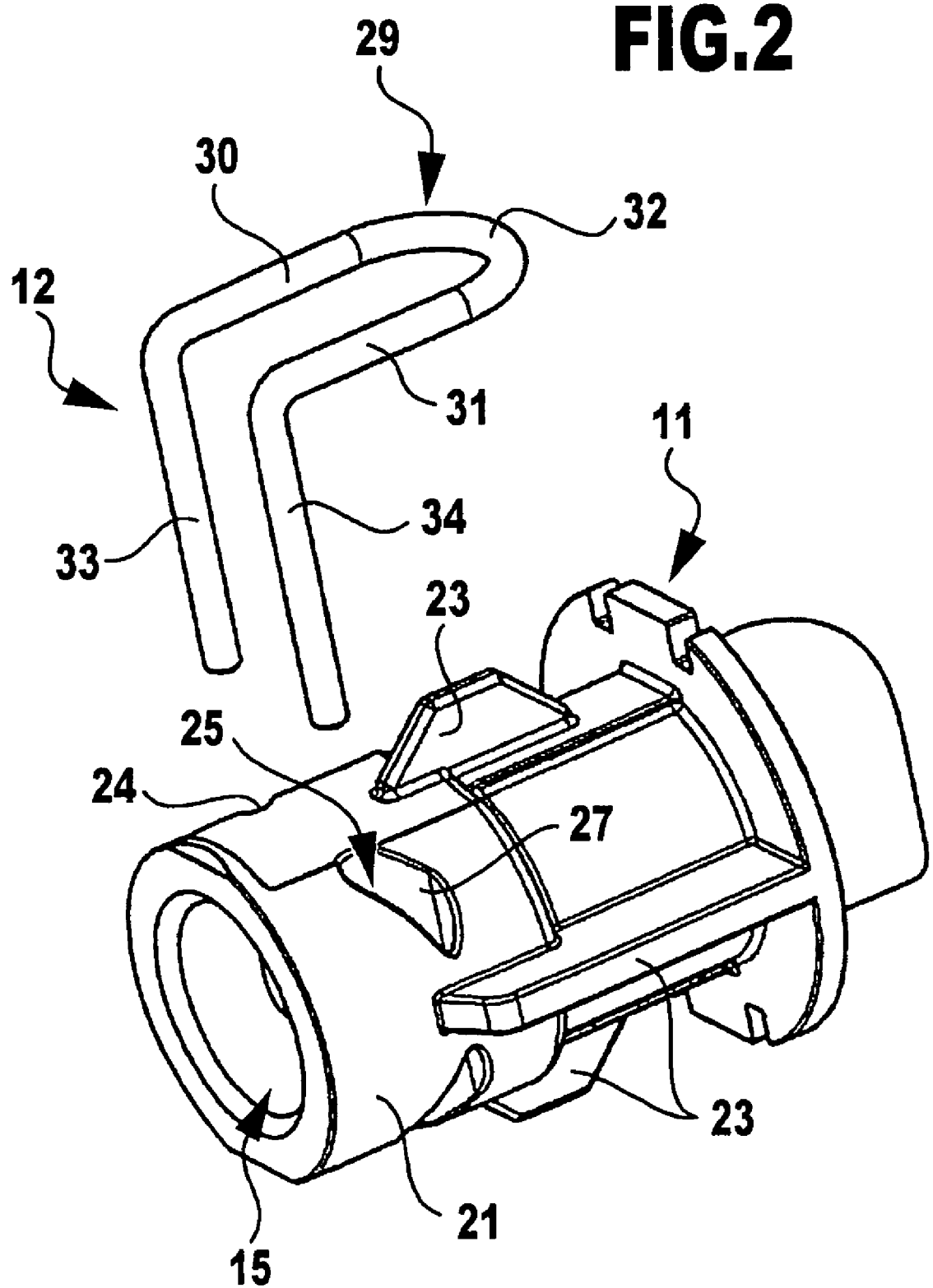
FIG. 2 shows a perspective illustration, in exploded form, of a coupling body and of a locking device of the coupling part from FIG. 1.

FIGS. 1 to 9b illustrate, schematically, a first embodiment of a coupling part for a plug connector arrangement, the coupling part being designated overall by the reference numeral 10. The coupling part 10 has a coupling body 11 as well as a locking device 12 and a sleeve 13.

The coupling body 11 is of substantially hollow-cylindrical configuration and has a receptacle 15 in the form of a stepped through-bore with a sealing portion 16 which widens, via a step, in the direction of a front side 17 of the coupling body 11 and merges into a locking portion 18, which opens out into the front side 17 via a widening 19. On its outside 21, the coupling body 11 carries a plurality of guide ribs 23 which are spaced apart uniformly from one another in the circumferential direction and are oriented parallel to the longitudinal axis 22 of the receptacle 15. In the region of the locking portion 18, as seen along the longitudinal axis 22, the coupling body 11 has two apertures, offset laterally from the longitudinal axis 22, in the form of two elongate holes 24, 25 which pass through the coupling body 11. The elongate holes 24 extend obliquely in relation to the longitudinal axis 22 and form a respective sliding surface 26, 27 by way of their wall surface which is directed toward the front side 17.

The locking device 12 is configured as a wire bracket and comprises a U-shaped spring element 29 with two legs 30, 31 which are oriented parallel to the longitudinal axis 22 and are connected integrally to one another via a semicircular crosspiece 32. The free ends of the legs 30 and 31 are followed in each case by a locking element in the form of a respective locking pin 33, 34 which is oriented at right angles to the respective leg 30, 31. As is clear, in particular, from FIGS. 1 and 2, the locking pins 33, 34 can be inserted laterally into the respective elongate holes 24 and 25, the spring element 29 being positioned in a flattened region of the outside 21 of the coupling body 11 and accommodating a guide rib 23 between its legs. The locking pins 33, 34 pass through the respective elongate holes 24 and 25, in which case they project beyond the respective elongate holes 24 and 25 by way of a first end region 35, which is directed away from the spring element 29, and by way of a second end region 36, which is directed toward the spring element 29.

The sleeve 13 forms an actuating element, by means of which the locking pins 33, 34 can be moved from a locking position into a release position. In the locking position, which is illustrated in FIGS. 1, 6a, 6b and 8a and 8b, the locking pins 33, 34 penetrate laterally into the locking portion 18 of the receptacle 15. In the release position, which is illustrated in FIGS. 7a, 7b and 9a and 9b, the locking pins 33, 34 release the locking portion 18 of the receptacle 15 and are spaced apart from one another to a greater extent than in the locking position.

The sleeve 13 encloses the coupling body 11 and the spring element 29, and also the locking pins 33, 34, in the circumferential direction and, on a level with the front side 17 of the coupling body 11, the sleeve 13, on the inside, has an annular shoulder 39 with two arcuate shoulder portions 40, 41 which are located diametrically opposite one another and between which are disposed, likewise diametrically opposite one another, two elastically deformable latching protrusions 43, 44. Directly adjacent to the latching protrusions 43, 44, each shoulder portion 40, 41 has a respective stop element 46 with a stop surface 47 which is oriented obliquely in relation to the longitudinal axis 22 and is directed away from the front side 17.

On the inside, the sleeve 13 carries two guide-rib pairs 49 located diametrically opposite one another.

Figure 3:
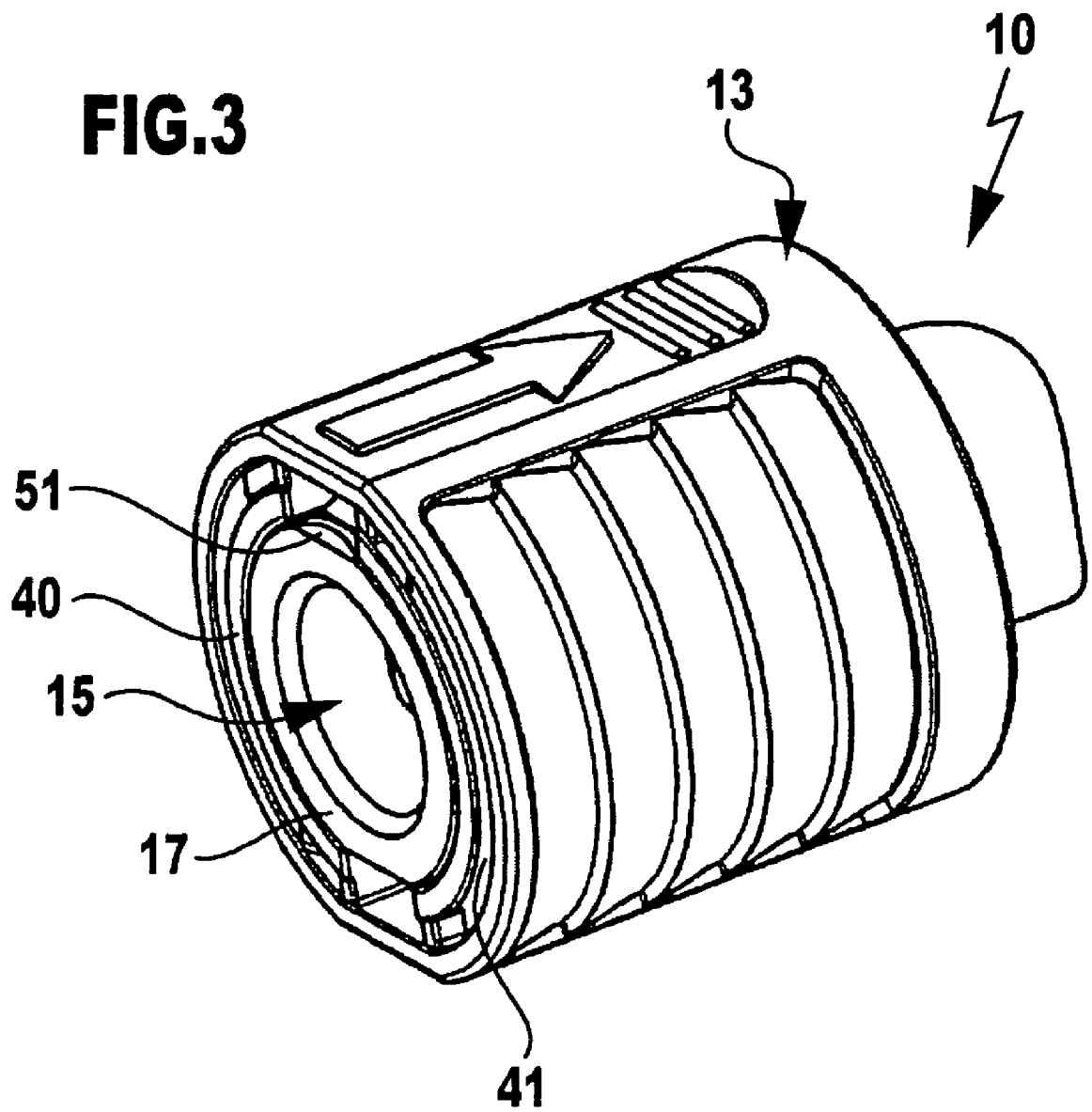
FIG. 3 shows a perspective illustration of the coupling part from FIG. 1 in the assembled state.
Figure 4:
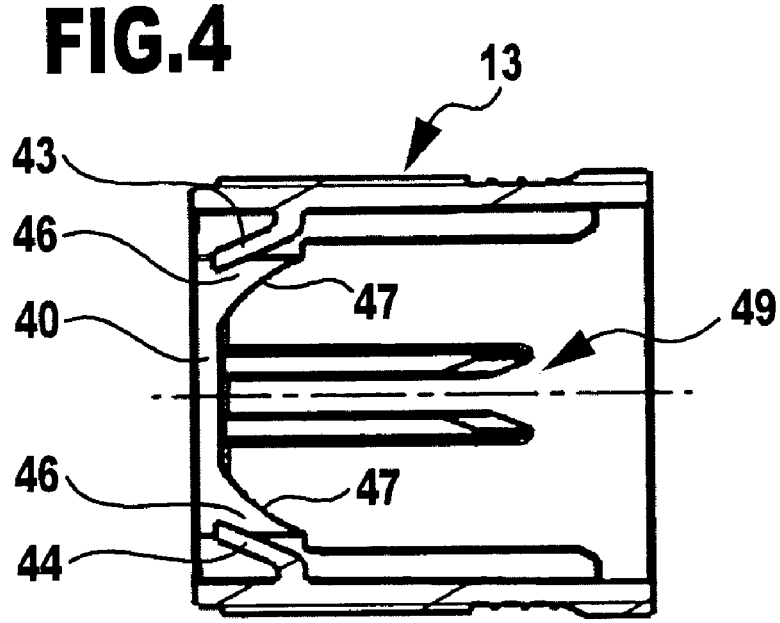
FIG. 4 shows a sectional view of a sleeve of the coupling part along line 4-4 in FIG. 1.
Figure 5:
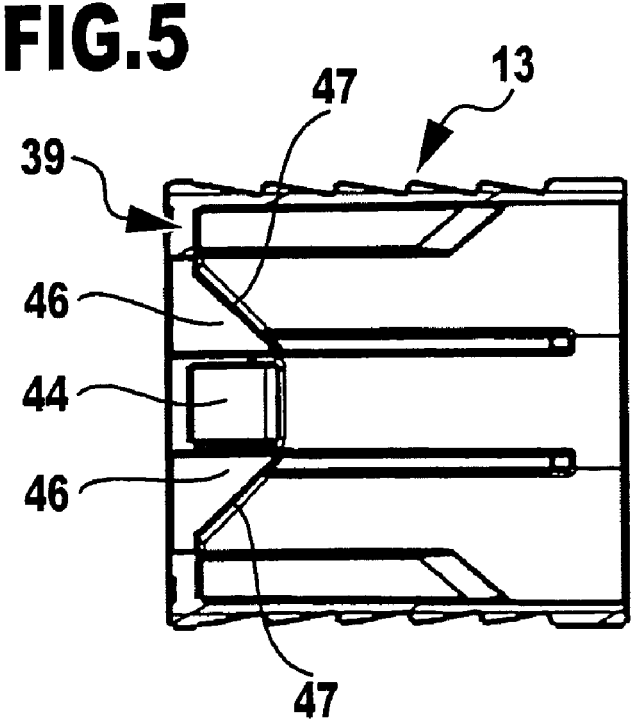
FIG. 5 shows a sectional view of the sleeve of the coupling part along line 5-5 in FIG. 1.
Figure 6B:
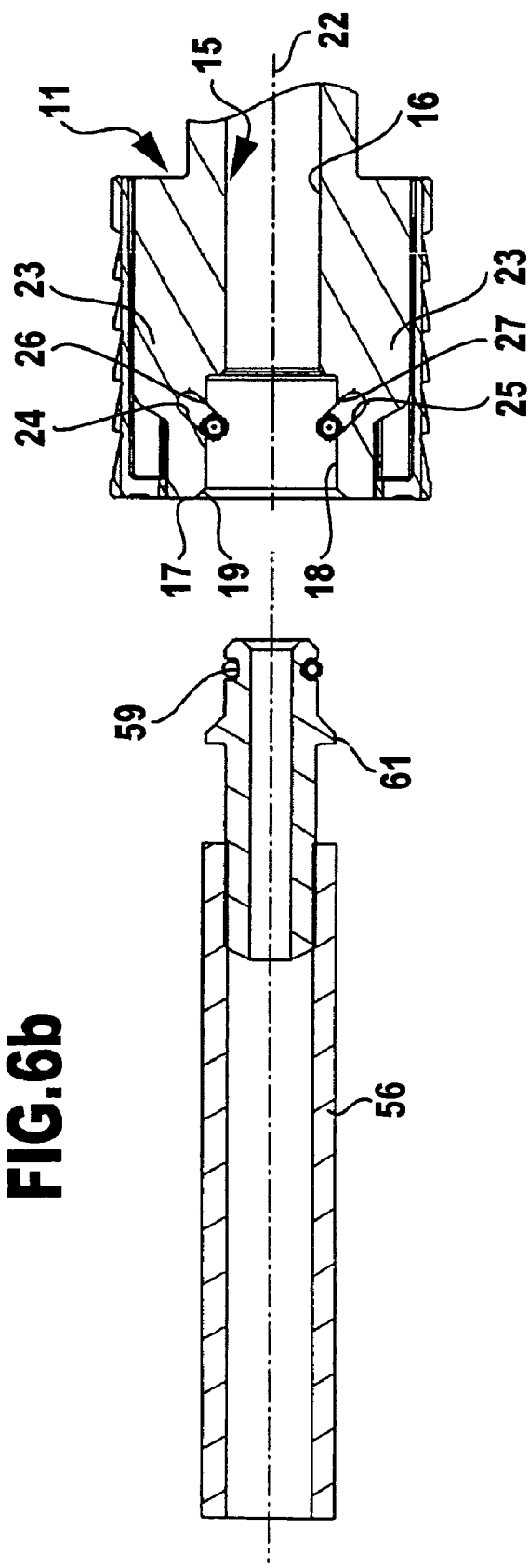
FIG. 6b shows a longitudinally sectioned view of the coupling part from FIG. 1 prior to the insertion of the plug-in part.
Figure 8B:
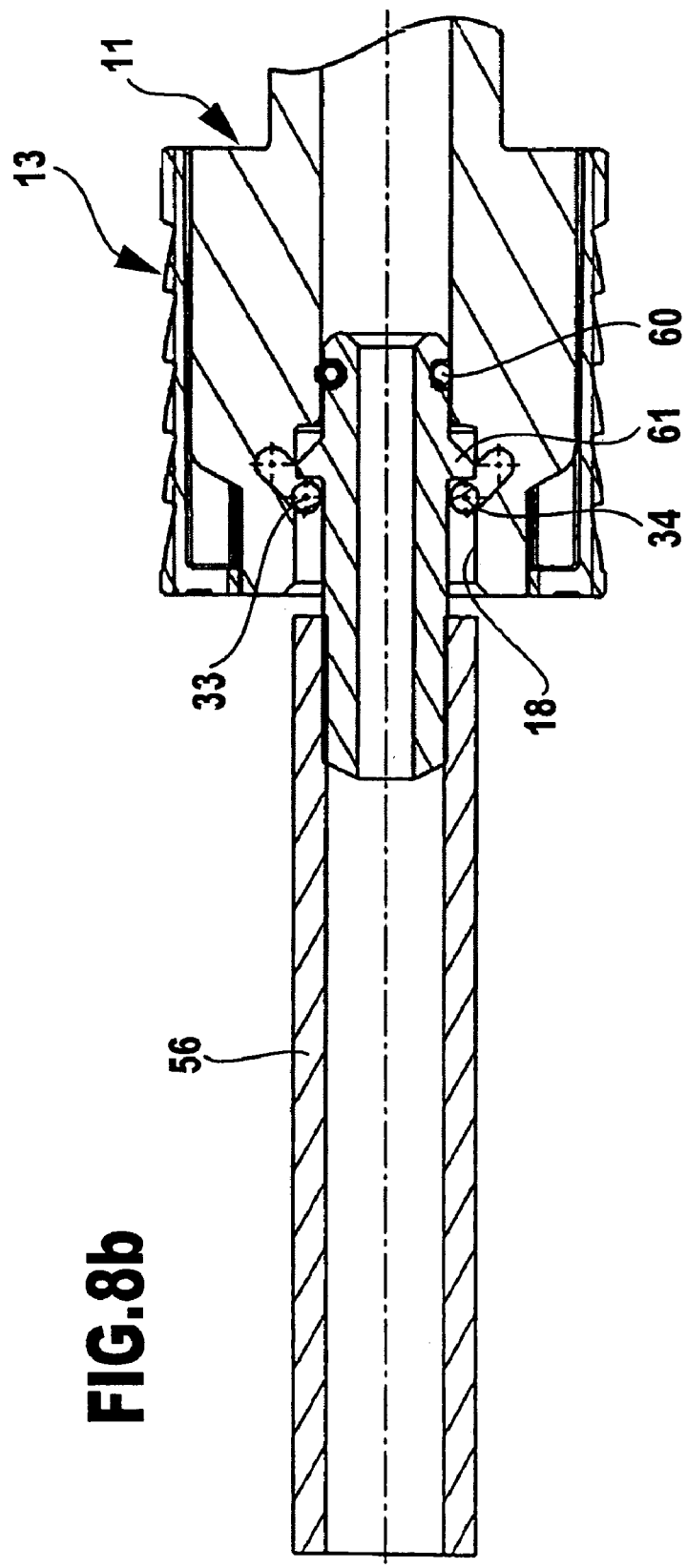
FIG. 8b shows a longitudinally sectioned view of the coupling part from FIG. 1 with the plug-in part inserted.
Figure 9A:
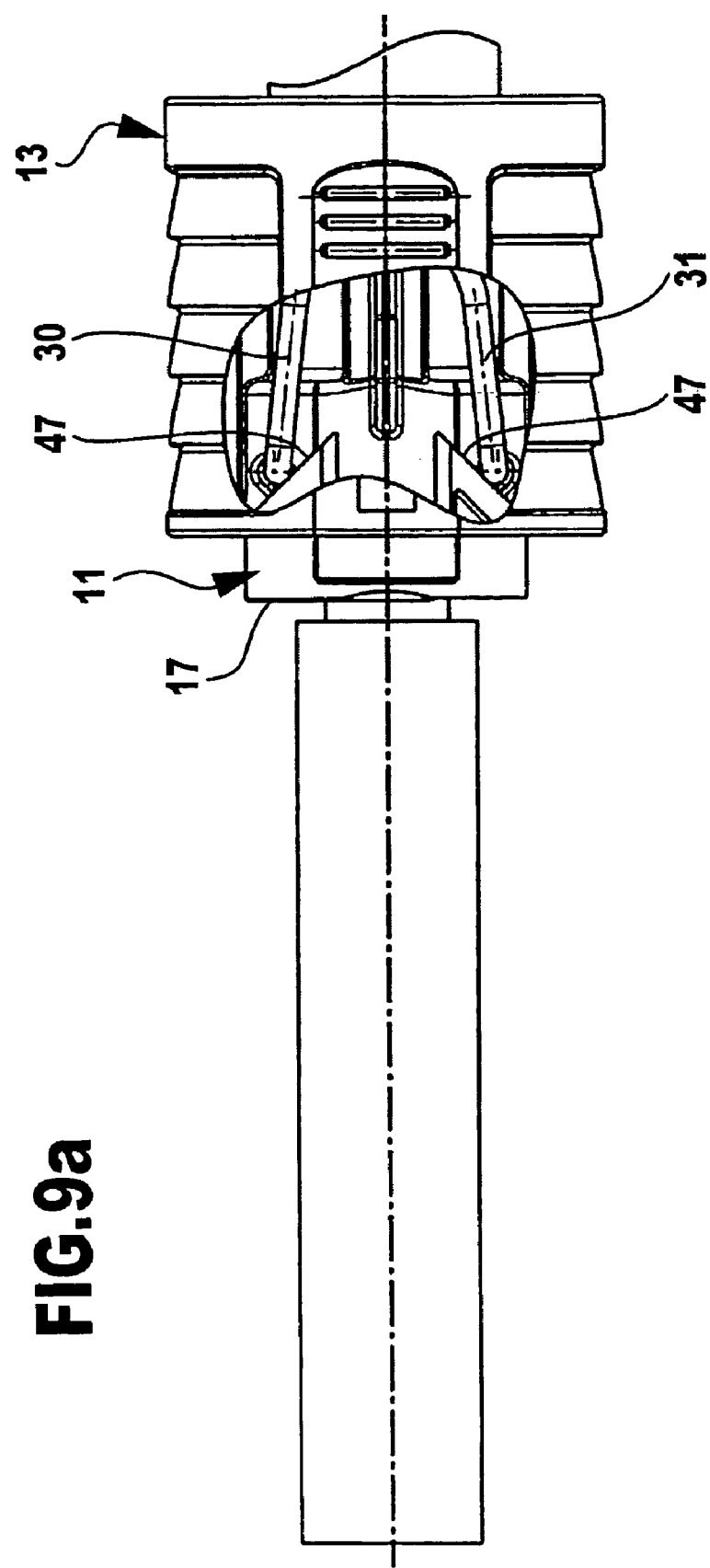
FIG. 9a shows a partially cut-away plan view of the coupling part from FIG. 1 as the inserted plug-in part is being released.
Figure 9B:
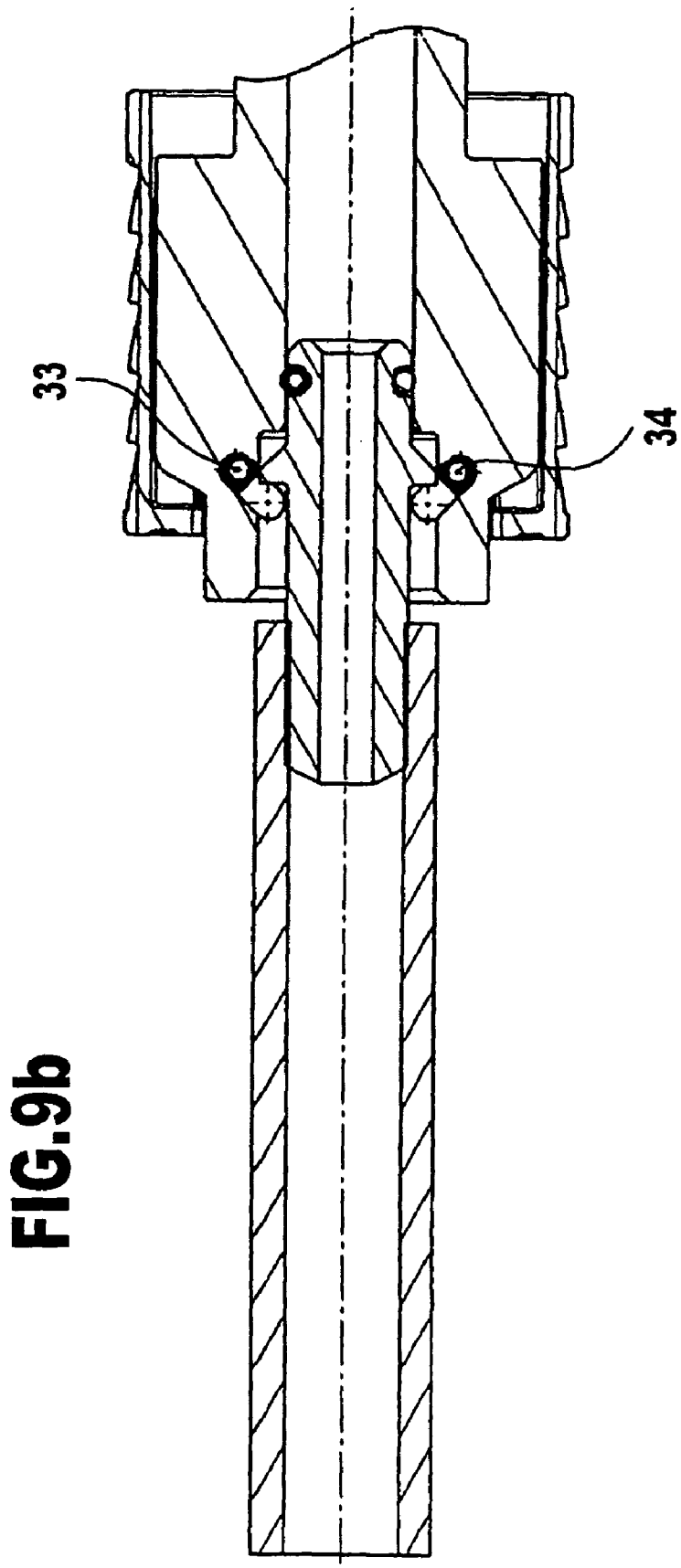
FIG. 9b shows a longitudinally sectioned view of the coupling part from FIG. 1 as the inserted plug-in part is being released.

In order to assemble the coupling part 10, in first instance, the locking device 12, with the spring element 29 and the locking pins 33, 34, can be fitted on the coupling body 11, as is illustrated in FIG. 1, and, thereafter, the sleeve 13 can be pushed onto the coupling body 11 in the axial direction. By virtue of this action, the latching protrusions 43, 44 engage at the front side 17 behind outer protrusions 51 disposed on the outside of the coupling body 11, so that the sleeve 13 snaps onto the coupling body 11 and is then retained thereon such that it cannot be rotated, but can be displaced in the direction of the longitudinal axis 22. If, starting from its rest position, which is illustrated in FIG. 3 and in which the annular shoulder 39 is disposed on a level with the front side 17, the sleeve 13 is displaced in the direction away from the front side 17, then the stop surfaces 47 of the shoulder portions 40 and 41 engage against the respective first and second end regions 35, 36 of the locking pins 33, 34. As the sleeve 13 is displaced further, the locking device 12 is displaced in the direction away from the front side 17, the locking pins 33, 34 sliding along the respective sliding surfaces 26 and 27 of the elongate holes 24, 25, and along the stop surfaces 47 of the annular shoulder 39, and the U-shaped spring element 29 is spread apart, so that the locking pins 33, 34 are transferred from their locking position into their release position.

A plug-in part 55, as is illustrated in FIGS. 6a to 9b, can be readily introduced into the receptacle 15 of the coupling body 11. The plug-in part 55 is in the form of a piece of tubing and, in the exemplary embodiment illustrated, a hose 56 has been plugged onto that end of the plug-in part 55 which is directed away from the front side 17 of the coupling body 11. The plug-in part 55, in the direction of the front side 17, has a sealing region 58 with an annular groove 59 into which a sealing ring 60 is embedded. At a spacing from the annular groove 59, the plug-in part 55 forms a locking region 57 comprising an annular bead 61 which runs all the way around in the circumferential direction and has a conical front face 62 and a rear face 63 which is oriented perpendicularly to the longitudinal axis 22 and forms an undercut, as seen with respect to the longitudinal axis 22. In the case of that embodiment of the plug-in part 55 which is illustrated in FIGS. 6a to 9b, both the sealing region 58 and the locking region 57 are rotationally symmetrical, as seen with respect to the longitudinal axis 22, and it is also the case that the locking portion 18 and the sealing portion 16 of the coupling body 11 have a corresponding rotationally symmetrical configuration.

If the plug-in part 55 is plugged into the receptacle 15 of the coupling body 11, then the front face 62 engages against the locking pins 33, 34 and, as the plug-in part 55 is introduced further into the receptacle 15, the locking pins 33, 34 are displaced, by the front face 62, along the respective sliding surfaces 26 and 27 until the annular bead 61 can pass through between the locking pins 33, 34, as is illustrated in FIGS. 7a and 7b. The sealing region 58 of the plug-in part 55 then assumes a position within the sealing portion 16 of the coupling body 11, the sealing ring 60 engaging in a fluid-tight manner against the wall of the sealing portion 16.

Once the annular bead 61 has been guided through between the locking pins 33, 34, the latter automatically resume, on account of the resilient restoring force to which they are subjected by the spring element 29, their locking position, in which they penetrate laterally into the locking portion 18 of the coupling body 11 and thus engage behind the annular bead 61. The plug-in part 55 is thus arrested axially in the receptacle 15 of the coupling body 11. In the case of the coupling part 10 which is illustrated in FIGS. 1 to 9b, there is no need, for the purpose of arresting the plug-in part 55, for the sleeve 13 to be displaced in the axial direction. A user can thus insert the plug-in part 55 into the coupling part 10 using one hand.

In order to release the plug-in part 55, the locking pins 33, 34 have to be pushed apart from one another. For this purpose, the user can displace the sleeve 13 axially until the stop surfaces 47, as has already been explained above, butt against the end regions 35, 36 of the locking pins 33, 34 and then transfer the latter into their release position as the sleeve 13 is displaced further. In this position, as is clear from FIGS. 9a and 9b, the plug-in part 55 can readily be removed from the receptacle 15. The user can subsequently release the sleeve 13, which, on account of the spring force of the spring element 29, is then displaced back, by the end regions 35, 36 of the locking pins 33, 34, into its rest position, which is illustrated in FIG. 3.

In combination with the plug-in part 55, the coupling part 10 forms a plug connector arrangement, by means of which for example two hoses or two sections of pipe can readily be connected to one another in a fluid-tight manner and, optionally, also separated from one another again.

Figure 10:
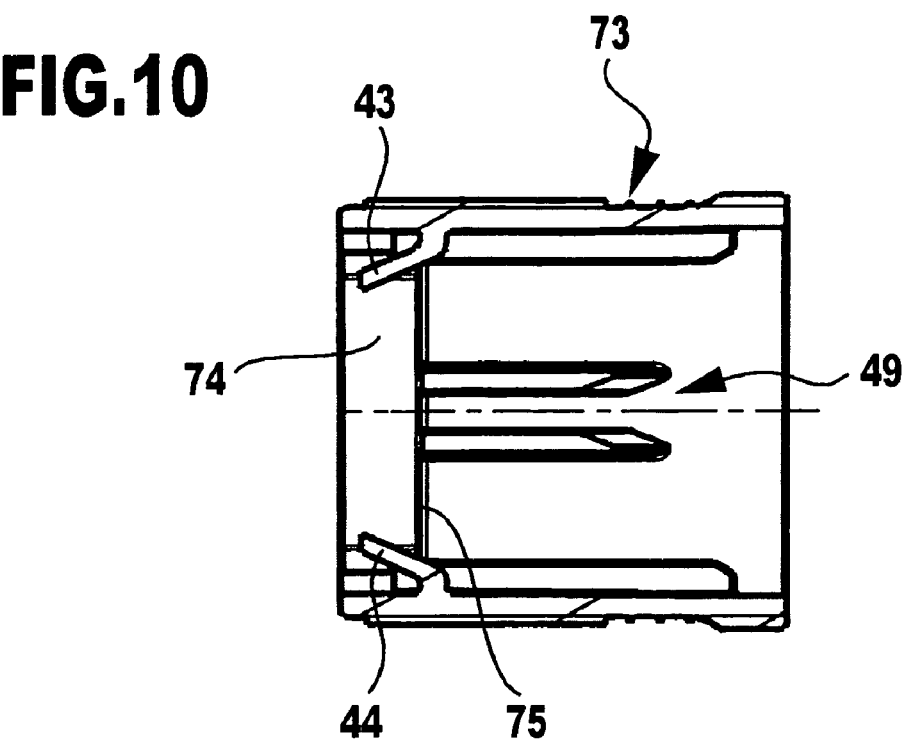
FIG. 10 shows a sectional view corresponding to FIG. 4, but this time of an alternative embodiment of a sleeve of the coupling part.
Figure 11:
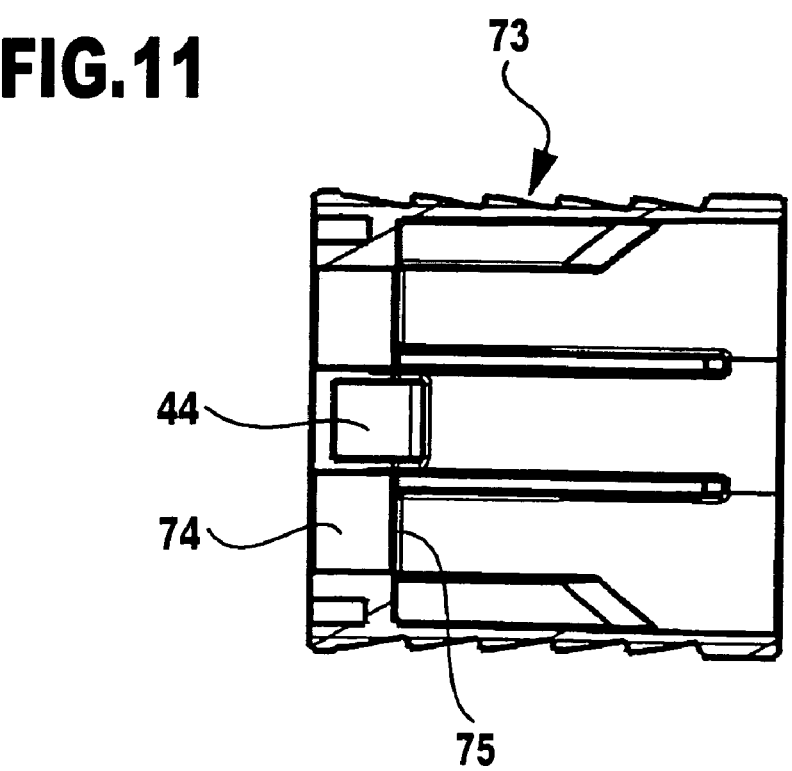
FIG. 11 shows a sectional view corresponding to FIG. 5, this time of the alternative embodiment of the sleeve.

FIGS. 10 and 11 illustrate an alternative embodiment of a sleeve which is designated overall by the reference numeral 73. This sleeve is largely identical to the sleeve 13 explained above. In contrast to the latter, the sleeve 73, however, does not have any stop elements 46 with stop surfaces 47 oriented obliquely in relation to the longitudinal axis 22; rather, the sleeve 73 comprises an annular shoulder 74 which is extended axially as compared with the annular shoulder 39 of the sleeve 13 and, by way of its rear side 75, which is directed away from the front side 17, forms a stop surface which runs in a plane oriented perpendicularly to the longitudinal axis 22, that is to say, unlike the stop surfaces 47, is not oriented obliquely to the longitudinal axis 22.

The sleeve 73 also can be snapped onto the coupling body 11. If the sleeve 73 is displaced in the direction away from the front side 17, then the rear side 75 of the annular shoulder 74 engages against the end regions 35 and 36 of the locking pins 33 and 34, which are then likewise displaced along the sliding surfaces 26, 27 of the elongate holes 24, 25 as the sleeve 73 is displaced further.

Figure 12:
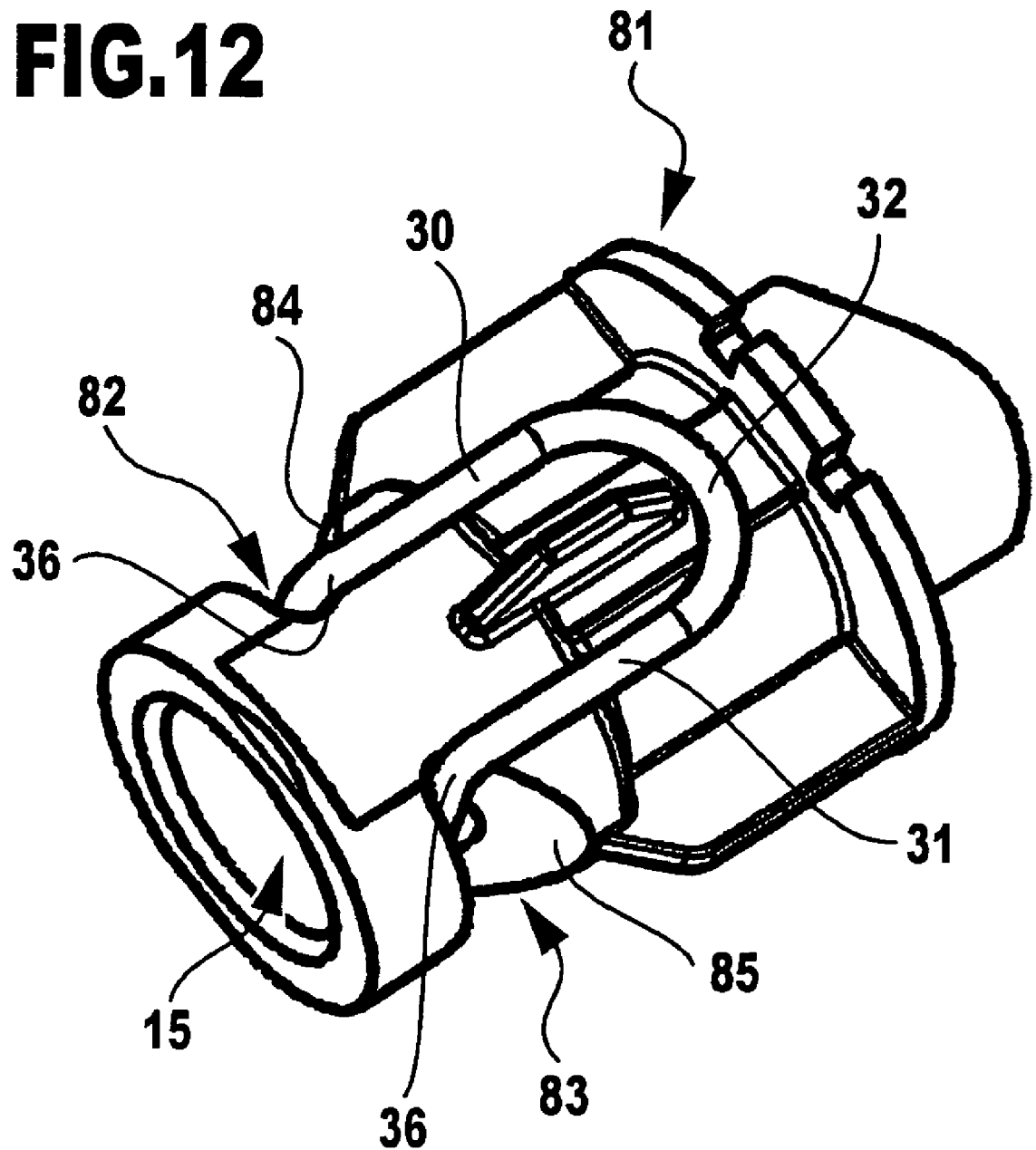
FIG. 12 shows a perspective illustration of an alternative configuration of a coupling body of the coupling part with the locking device assembled.

FIG. 12 illustrates an alternative embodiment of a coupling body which is designated overall by the reference numeral 81. This coupling body is largely identical to the coupling body 11 explained above. In contrast to the latter, however, the coupling body 81, rather than having any elongate holes, has lateral slots 82, 83 which are disposed in the region of the locking portion 18, open out in the outside 21 of the coupling body 81 and extend into the region of the locking portion 18 of the coupling body 81. In a manner corresponding to the elongate holes 24, 25, the slots 82, 83 each accommodate a respective locking pin 33, 34 and each form, by way of a wall region, a respective sliding surface 84, 85 which is oriented obliquely in relation to the longitudinal axis 22 and along which the locking pins 33, 34 can slide as the sleeve 13 or the sleeve 73 is displaced.

Figure 13:
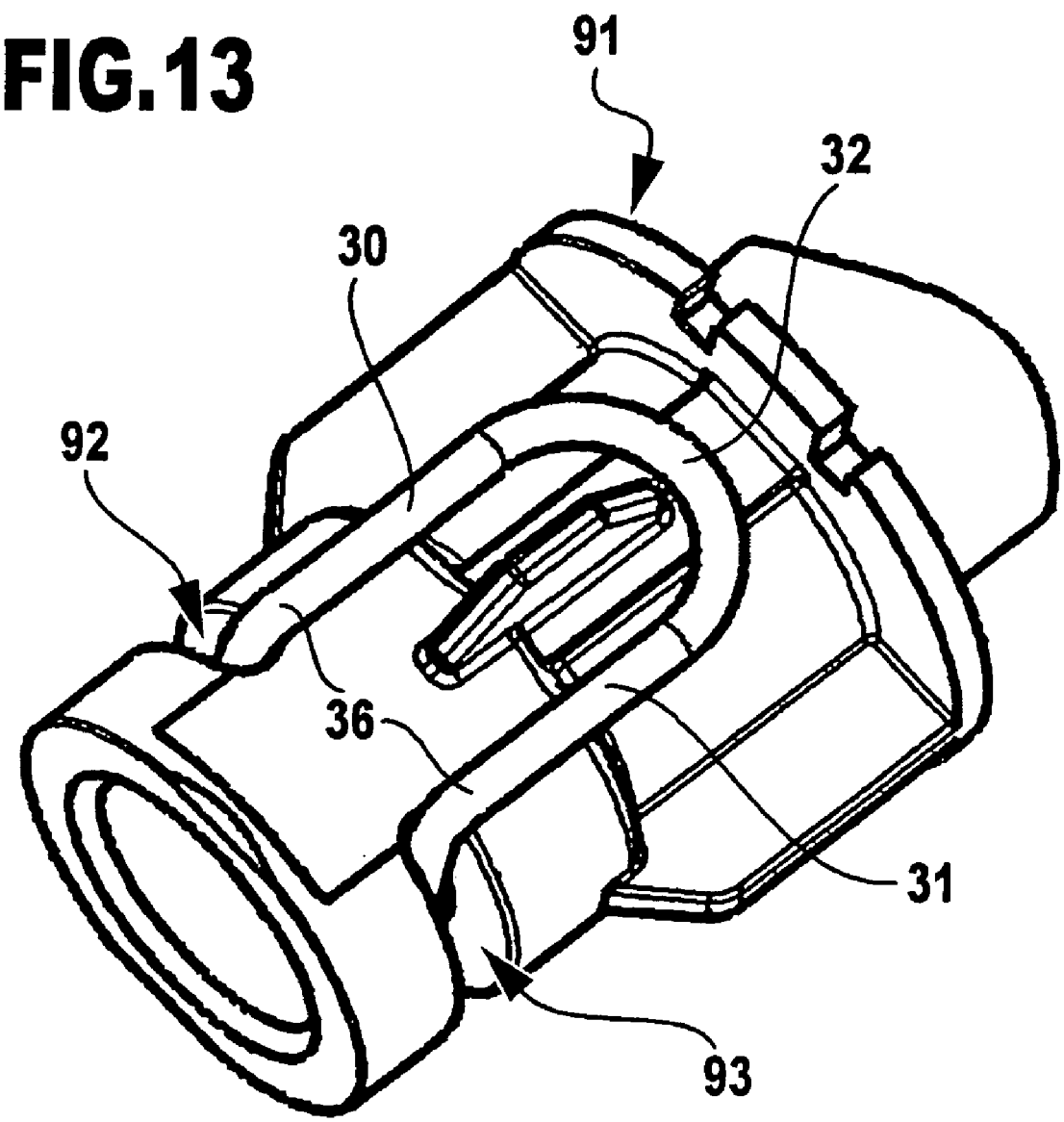
FIG. 13 shows a further alternative configuration of a coupling body with the locking device assembled.

FIG. 13 illustrates a further alternative embodiment of a coupling body which is designated overall by the reference numeral 91 and is largely identical to the coupling body 11 explained above. Unlike the latter, this coupling body, instead of the elongate holes 24, 25, has lateral slots 92, 93, which are oriented radially, open out into the outside 21 of the coupling body 91 and each accommodate a locking pin 33, 34. In combination with the sleeve 13, the coupling body 91 forms a coupling part according to the invention. The sleeve 13 can be snapped onto the coupling body 91 and, by virtue of the sleeve 13 being displaced, the locking pins 33, 34, which are disposed in the slots 92, 93, can be transferred out of their locking position, which is illustrated in FIG. 13, into a release position. The end regions 35, 36 of the locking pins 33, 34 slide along the stop surfaces 47 of the sleeve 13 and are thus pushed apart from one another.

Figure 14:
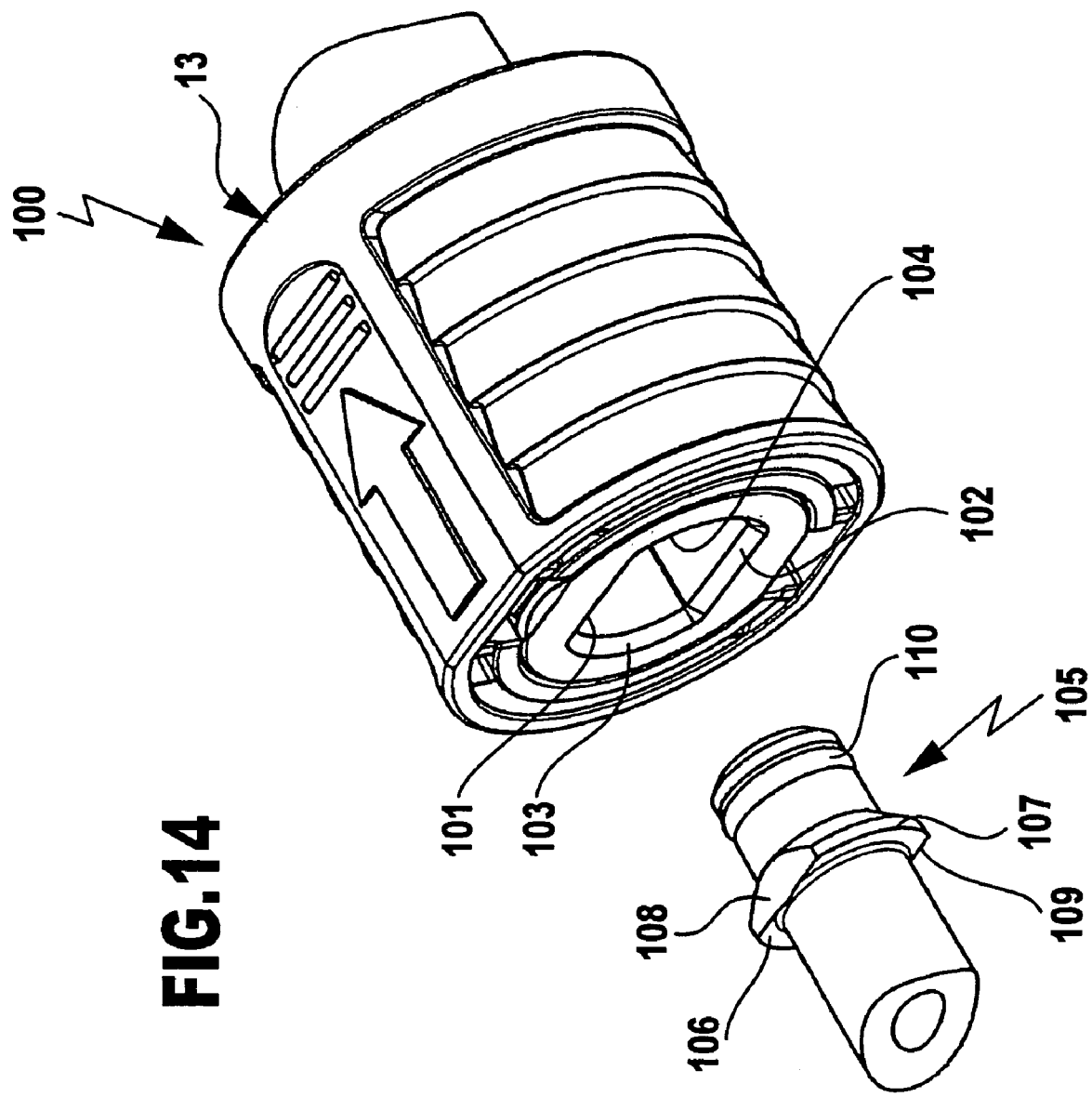
FIG. 14 shows a perspective illustration of a second embodiment of a coupling part and of an associated plug-in part.

FIG. 14 illustrates an alternative embodiment of a coupling part according to the invention which is designated overall by the reference numeral 100. FIG. 14 also illustrates an alternative embodiment of a plug-in part according to the invention, which is designated overall by the reference numeral 105.

The coupling part 100 differs from the coupling part 10 explained above merely by the fact that the locking portion 18 of the receptacle 15 is rotationally asymmetrical, as seen with respect to the longitudinal axis 22. It comprises two flat wall portions 101, 102 which are located diametrically opposite one another and are connected to one another via arcuate wall portions 103, 104.

The plug-in part 105 is largely identical to the plug-in part 55 explained above. Unlike the latter, however, it has two outer beads 106, 107 which each extend circumferentially only over a sub-region, are located diametrically opposite one another and are connected to one another in each case via a lateral flattened portion 108, 109.

It is also the case that the plug-in part 105, adjacent to its free end, carries a rotationally symmetrical annular grove, which accommodates a sealing ring 110. The plug-in part 105 can be inserted into the receptacle of the coupling part 100, the rotationally asymmetrical configuration of the outer beads 106 and 107 and of the locking portion of the coupling part 100 ensuring that the plug-in part 105, when inserted into the coupling part 100, cannot be rotated. It is thus secured in the coupling part 100 both in the axial direction and in the radial direction. This avoids the situation where the sealing ring 110 is subjected to wear as a result of the plug-in part 105 rotating. Moreover, the plug-in part 105 can only be inserted into the coupling part 100 with predefined orientation. The plug-in part 105 is distinguished by a particularly small amount of material being used, and it can thus be produced in a particularly cost-effective manner. It is only in the region of the locking pins 33, 34 that the plug-in part 105 has corresponding undercuts in the form of the outer beads 106, 107, whereas the regions between the locking pins 33, 34 are formed without any undercuts.

The invention claimed is:

1. Coupling part for a plug connector arrangement, comprising:
    a coupling body comprising a receptacle which a plug-in part of the plug connector arrangement can be plugged into in a direction of a longitudinal axis of the receptacle in order to produce a fluid-tight connection,
    two spaced-apart locking elements which, in a locking position, penetrate laterally, opposite one another, into the receptacle in order to engage with the plug-in part and which can be moved into a release position in order to release the plug-in part,
    a spring element integrally formed with and connecting the locking elements together, and
    an actuating element enclosing the coupling body in a circumferential direction and which is adapted to be moved relative to the coupling body, wherein longitudinal movement of the actuating element causes the locking elements to be moved counter to a resilient restoring force from a locking position into the release position in which the locking elements are spaced apart from one another to a greater extent than in the locking position.

2. Coupling part according to claim 1, wherein the actuating element is adapted to be displaced coaxially in relation to the longitudinal axis of the receptacle.

3. Coupling part according to claim 1, wherein the locking elements are configured as locking pins which pass laterally through the receptacle.

4. Coupling part according to claim 3, wherein the locking pins are oriented parallel to one another in the locking position and in the release position.

5. Coupling part according to claim 1, wherein the spring element is of U-shaped configuration and has two legs which are oriented parallel to the longitudinal axis of the receptacle and are connected to one another via a cross-piece.

6. Coupling part according to claim 1, wherein the spring element is disposed on an outside of the coupling body.

7. Coupling part according to claim 6, wherein the actuating element is configured as a sleeve which encloses the coupling body and the spring element in a circumferential direction.

8. Coupling part according to claim 7, wherein the sleeve is adapted to be latched to the coupling body.

9. Coupling part according to claim 8, wherein two latching protrusions are carried on an inside of the sleeve, which latching protrusions are located diametrically opposite one another and each interact with a latching element disposed on an outside of the coupling body.

10. Coupling part according to claim 1, wherein at least one of the coupling body and the actuating element has sliding surfaces which are oriented obliquely in relation to the longitudinal axis of the receptacle and along which the locking elements slide during transfer from the locking position into the release position.

11. Coupling part according to claim 10, wherein the coupling body has two apertures which are located diametrically opposite one another and have a wall surface which is oriented obliquely in relation to the longitudinal axis of the receptacle and forms a sliding surface, the locking elements each penetrating into an aperture.

12. Coupling part according to claim 11, wherein the apertures are configured as elongate holes.

13. Coupling part according to claim 11, wherein the apertures are configured as slots which open out into an outer surface of the coupling body.

14. Coupling part according to claim 11, wherein the locking elements pass through the apertures.

15. Coupling part according to claim 1, wherein:
the actuating element encloses the coupling body in a circumferential direction and has at least two stop elements,
each stop element has a stop surface which is oriented obliquely in relation to the longitudinal axis of the receptacle,
each stop surface forming a sliding surface, and
the locking elements are adapted to be positioned against the respective stop surfaces by way of an end portion which projects beyond an outer surface of the coupling body.

16. Coupling part according to claim 15, wherein:
the actuating element has two stop elements, each stop element being associated with a respective one of the locking elements, and
each of the respective locking elements is adapted to be positioned against the respective stop surfaces of the stop elements by way of first and second end portions which are directed away from one another.

17. Coupling part according to claim 15, wherein the actuating element is configured as a sleeve which encloses the coupling body in the circumferential direction and has a radially inwardly directed annular shoulder on which the stop elements are integrally formed.

18. Coupling part according to claim 7, wherein the sleeve is retained on the coupling body such that it cannot be rotated about the longitudinal axis of the receptacle, but can be displaced coaxially in relation to the longitudinal axis.

19. Coupling part according to claim 18, wherein first guide elements are disposed on an inside of the sleeve, which first guide elements interact with second guide elements disposed on an outside of the coupling body.

20. Coupling part according to claim 19, wherein at least one of the first and second guide elements are configured as guide ribs which are oriented parallel to the longitudinal axis of the receptacle.

21. Coupling part according to claim 1, wherein:
the receptacle forms a sealing portion and a locking portion,
the sealing portion has a cross-section which is rotationally symmetrical in relation to the longitudinal axis of the receptacle,
the locking portion has a cross-section which is rotationally asymmetrical in relation to the longitudinal axis of the receptacle, and
the locking elements penetrating into the locking portion.

22. Coupling part according to claim 21, wherein the locking portion has two flat wall portions which are located diametrically opposite one another and are connected to one another via two arcuate wall portions.

23. Plug connector arrangement, comprising:
a coupling part and
a plug-in part,
said coupling part comprising:
a coupling body comprising a receptacle into which the plug-in part of the plug connector arrangement can be plugged into in a direction of a longitudinal axis of the receptacle in order to produce a fluid-tight connection,
two spaced-apart locking elements which, in a locking position, penetrate laterally, opposite one another, into the receptacle in order to engage with the plug-in part and which can be moved into a release position in order to release the plug-in part,
a spring element integrally formed with and connecting the locking elements together, and
an actuating element enclosing the coupling body in a circumferential direction and which is adapted to be moved relative to the coupling body, wherein longitudinal movement of the actuating element causes the locking elements to be moved counter to a resilient restoring force from a locking position into the release position in which the locking elements are spaced apart from one another to a greater extent than in the locking position,
said plug-in part being adapted to be plugged into the receptacle of the coupling body, said plug-in part having at least one undercut on an outside surface which interacts with the locking elements in order to lock the plug-in part in the receptacle.

24. Plug connector arrangement according to claim 23, wherein the undercut extends in a circumferential direction of the plug-in part over a sub-region.

25. Plug connector arrangement according to claim 24, wherein the plug-in part has a sealing portion and a locking portion, the sealing portion carrying a circular annular groove on an outside, and the locking portion having at least one protrusion which extends in the circumferential direction over a sub-region.

26. Plug connector arrangement part according to claim 25, wherein the plug-in part comprises two protrusions which are located diametrically opposite one another, extend circumferentially in each case over a sub-region, and are connected to one another via lateral flattened portions.

27. Plug connector arrangement according to claim 25, wherein the at least one protrusion has a conical end surface.

* * * * *